(12) United States Patent
Hickey

(10) Patent No.: US 11,923,578 B2
(45) Date of Patent: Mar. 5, 2024

(54) REVERSIBLE FUEL CELL SYSTEM ARCHITECTURE

(71) Applicant: Cummins Inc., Columbus, IN (US)

(72) Inventor: Darren B. Hickey, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/785,894

(22) PCT Filed: Dec. 18, 2020

(86) PCT No.: PCT/US2020/065930
§ 371 (c)(1),
(2) Date: Jun. 15, 2022

(87) PCT Pub. No.: WO2021/127386
PCT Pub. Date: Jun. 24, 2021

(65) Prior Publication Data
US 2023/0028759 A1 Jan. 26, 2023

Related U.S. Application Data

(60) Provisional application No. 62/951,661, filed on Dec. 20, 2019.

(51) Int. Cl.
*H01M 8/0612* (2016.01)
*H01M 8/04007* (2016.01)
(Continued)

(52) U.S. Cl.
CPC ..... *H01M 8/0618* (2013.01); *H01M 8/04014* (2013.01); *H01M 8/04067* (2013.01);
(Continued)

(58) Field of Classification Search
CPC ............. H01M 8/0618; H01M 8/1231; H01M 8/04014; H01M 8/04067; H01M 8/04089; H01M 8/04708; H01M 2008/1293
See application file for complete search history.

(56) References Cited

U.S. PATENT DOCUMENTS

| 6,994,829 B2 | 2/2006 | Whyatt |
| 7,045,238 B2 | 5/2006 | Gottmann et al. |

(Continued)

FOREIGN PATENT DOCUMENTS

| CN | 105365808 A | 3/2016 |
| CN | 106133973 A | 11/2016 |

(Continued)

OTHER PUBLICATIONS

International Search Report and Written Opinion for International Patent Application No. PCT/US2020/065930, filed Dec. 18, 2020, dated Mar. 23, 2021.

*Primary Examiner* — Matthew J Merkling
(74) *Attorney, Agent, or Firm* — Faegre Drinker Biddle & Reath LLP

(57) ABSTRACT

A method of maintaining a thermal balance in a solid oxide reversible fuel cell system comprising a solid oxide reversible fuel cell, an air intake for providing air to the solid oxide reversible fuel cell, and a steam reformer fluidly coupled to the solid oxide fuel cell for providing fuel to the solid oxide reversible fuel cell. The method comprising operating the solid oxide reversible fuel cell system in a forward mode in which the steam former receives natural gas and produces hydrogen gas and carbon monoxide to be provided to the solid oxide reversible fuel cell, and operating the solid oxide reversible fuel cell system in a reverse mode in which the steam reformer receives hydrogen gas and carbon dioxide from the solid oxide reversible fuel cell and produces natural gas and water.

13 Claims, 2 Drawing Sheets

(51) Int. Cl.
  *H01M 8/04014*  (2016.01)
  *H01M 8/04089*  (2016.01)
  *H01M 8/04701*  (2016.01)
  *H01M 8/12*  (2016.01)
  *H01M 8/1231*  (2016.01)

(52) U.S. Cl.
  CPC ... *H01M 8/04089* (2013.01); *H01M 8/04708* (2013.01); *H01M 8/1231* (2016.02); *H01M 2008/1293* (2013.01)

(56) References Cited

U.S. PATENT DOCUMENTS

| | | | |
|---|---|---|---|
| 7,201,979 | B2 | 4/2007 | McElroy et al. |
| 7,482,078 | B2 * | 1/2009 | Sridhar ............... C01B 3/48 |
| | | | 429/418 |
| 8,071,241 | B2 | 12/2011 | Sridhar |
| 9,945,039 | B2 | 4/2018 | Barnett |
| 10,208,665 | B2 | 2/2019 | Simpson |
| 2004/0191595 | A1 | 9/2004 | McElroy |
| 2004/0191597 | A1 | 9/2004 | McElroy |
| 2004/0202914 | A1 | 10/2004 | Sridhar |
| 2006/0127719 | A1 | 6/2006 | Brantley |
| 2008/0070078 | A1 * | 3/2008 | Gummalla ........ H01M 8/04141 |
| | | | 429/495 |
| 2008/0241612 | A1 | 10/2008 | Ballantine |
| 2012/0251912 | A1 * | 10/2012 | Braun ..................... C25B 1/04 |
| | | | 204/241 |
| 2012/0282534 | A1 | 11/2012 | Braun |
| 2015/0129805 | A1 | 5/2015 | Karpenko |
| 2018/0115003 | A1 * | 4/2018 | Reytier ............... H01M 8/0656 |

FOREIGN PATENT DOCUMENTS

| | | |
|---|---|---|
| CN | 106463743 A | 2/2017 |
| CN | 106784960 A | 5/2017 |
| CN | 107431219 A | 12/2017 |
| CN | 108604695 A | 9/2018 |
| CN | 109411798 A | 3/2019 |
| CN | 110544785 A | 12/2019 |
| CN | 101926040 A | 12/2020 |
| EP | 3499626 A1 | 6/2019 |
| WO | 2004086585 A2 | 10/2004 |

* cited by examiner

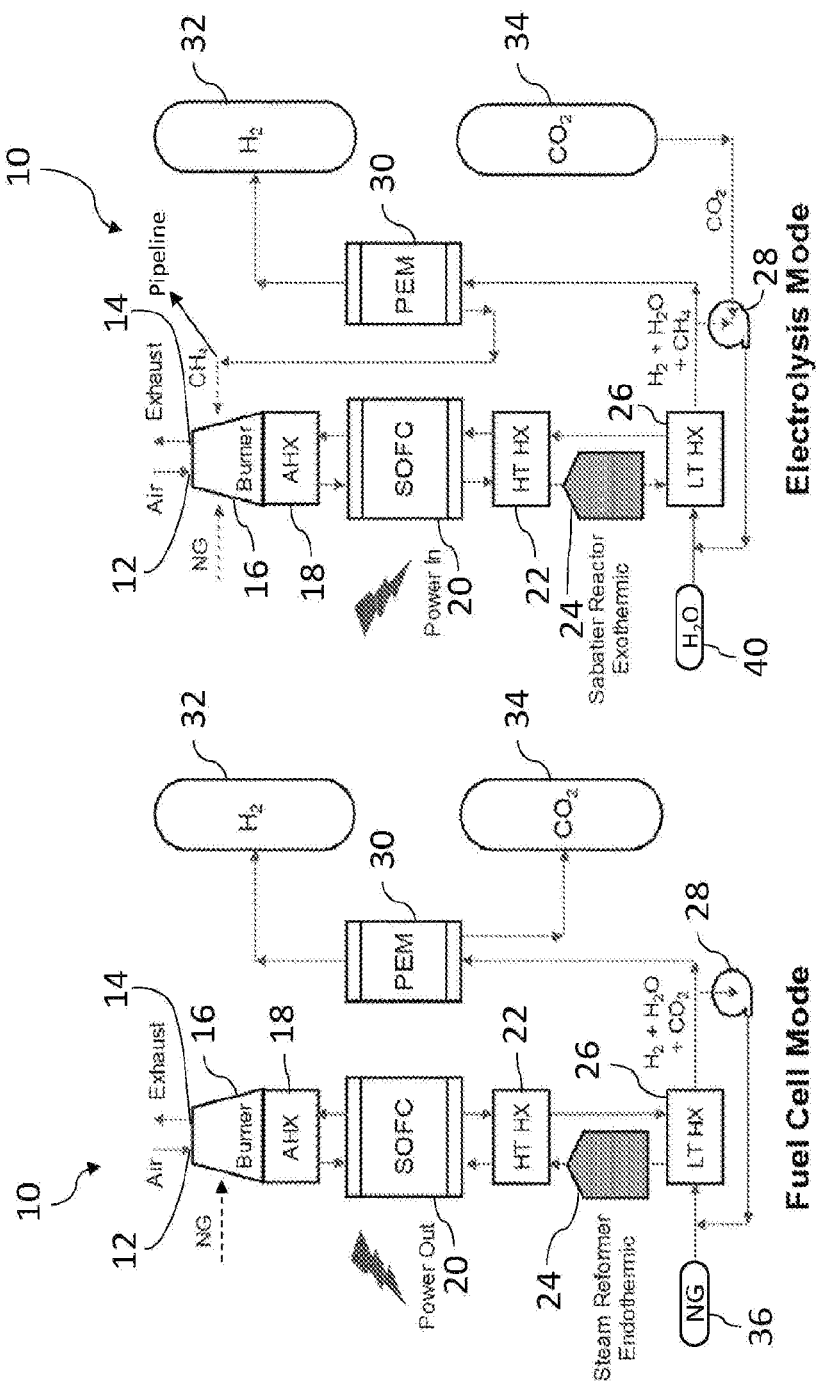

Fuel Cell Mode
Steam Reformer
500 - 700°C $CH_4 + H_2O \rightarrow CO + 3H_2$
$\Delta H = -206$ kJ/mol
$CO + H_2O \rightarrow CO_2 + H_2$
$\Delta H = -41$ kJ/mol
$CH_4 + 2H_2O \rightarrow CO_2 + 4H_2$
$\Delta H = 165$ kJ/mol

Electrolysis Mode
Sabatier Reactor
300 - 500°C $CO_2 + 4H_2 \rightarrow CH_4 + 2H_2O$
$\Delta H = -165$ kJ/mol
$CO + 3H_2 \rightarrow CH_4 + H_2O$
$\Delta H = -206$ kJ/mol

REVERSIBLE FUEL CELL SYSTEM ARCHITECTURE

CROSS-REFERENCE TO RELATED APPLICATIONS

This application claims priority to International Patent Application No. PCT/US2020/065930, filed Dec. 18, 2020, which claims priority to U.S. Provisional Patent Application No. 62/951,661 filed Dec. 20, 2019, the subject matter of which are incorporated herein by reference.

TECHNICAL FIELD OF THE DISCLOSURE

The present disclosure relates to a reversible fuel cell system capable of forward and reverse modes to maintain a thermal balance of the reversible fuel cell system and prevent the reversible fuel cell system from cooling down.

BACKGROUND OF THE DISCLOSURE

A major challenge for current closed cycle battery type solid oxide reversible fuel cells (SORFCs) is the thermal management when operating in the endothermic electrolysis or reverse mode. If the system operates below the thermal neutral point, it will begin to cool down causing operational concerns. Current proposed solutions to ensure operation at the thermal neutral point, such as thermal storage, have design, safety, and structural implications while only providing a limited heat source. Additionally, it has previously been proposed to perform exothermic methanation reaction inside the fuel cell itself, however this would need to be done at reduced temperatures and elevated pressure, which also has design, safety, and structural implications. Performance degradation has always been a concern for high temperature SORFCs. Thus, a need exists for a SORFC system that is capable of maintaining sufficient thermal heat while in different modes.

SUMMARY OF THE DISCLOSURE

In one embodiment of the present disclosure, a solid oxide reversible fuel cell system is provided. The solid oxide reversible fuel cell system comprises a solid oxide reversible fuel cell, an air intake for providing air to the solid oxide reversible fuel cell, a steam reformer fluidly coupled to the solid oxide fuel cell, the steam reformer having a catalyst, and a proton exchange member hydrogen pump configured to receive by-products from at least one of the steam reformer and the solid oxide reversible fuel cell, the proton exchange member hydrogen pump configured to form hydrogen gas from the by-products, wherein the steam reformer acts in a forward mode to produce hydrogen gas and a reverse mode to produce water and natural gas.

In another embodiment of the present disclosure, a method of maintaining a thermal balance in a solid oxide reversible fuel cell system comprising a solid oxide reversible fuel cell, an air intake for providing air to the solid oxide reversible fuel cell, and a steam reformer fluidly coupled to the solid oxide fuel cell for providing fuel to the solid oxide reversible fuel cell is provided. The method comprises operating the solid oxide reversible fuel cell system in a forward mode in which the steam reformer receives natural gas and produces hydrogen gas to be provided to the solid oxide reversible fuel cell such that the solid oxide reversible fuel cell can produce electrical power from the air and the hydrogen gas received therein, and operating the solid oxide reversible fuel cell system in a reverse mode in which the steam reformer acts as a Sabatier Reactor and receives hydrogen gas and carbon dioxide from the solid oxide reversible fuel cell and produces natural gas and water

BRIEF DESCRIPTION OF THE DRAWINGS

Advantages and features of the embodiments of this disclosure will become more apparent from the following detailed description of exemplary embodiments when viewed in conjunction with the accompanying drawings, wherein:

FIG. 1A shows a diagram of a reversible fuel cell system of the present disclosure in a fuel cell or forward mode in which electrical power is being produced from natural gas;

FIG. 1B shows a diagram of the reversible fuel cell system of FIG. 1A in an electrolysis or reverse mode in which electrical power is being consumed and natural gas is being formed;

Figure 2A:
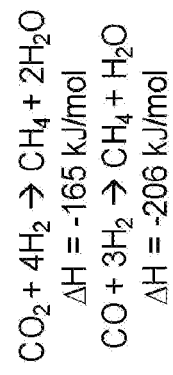
FIG. 2A shows reactions carried out in a steam reformer of the reversible fuel cell system of FIG. 1A.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplifications set out herein illustrate embodiments of the disclosure, in one form, and such exemplifications are not to be construed as limiting the scope of the disclosure in any manner.

DETAILED DESCRIPTION OF THE DRAWINGS

Referring to FIGS. 1A and 1B, a diagram of a reversible fuel cell system 10 is generally shown. FIG. 1A shows reversible fuel cell system 10 in a fuel cell or forward mode in which electrical power is being produced from natural gas, while FIG. 1B shows reversible fuel cell system 10 in an electrolysis or reverse mode in which electrical power is being consumed and natural gas is being formed. In general, fuel cell system 10 includes an air intake 12 and an air exhaust 14 fluidly coupled to a heat source 16, illustratively a burner. Heat source 16 is coupled to an air heat exchanger 18 for providing oxygen-containing air to a solid oxide reversible fuel cell 20, which is in communication with air intake 12 and is configured to receive the oxygen-containing air. A steam reformer/Sabatier reactor 24 is coupled to fuel cell 20 through a high temperature heat exchange (HT HX) 22. Additionally, a proton exchange membrane (PEM) hydrogen pump 30 is configured to receive by-products from fuel cell 20 and/or steam reformer 24, and a low temperature heat exchanger (LT HX) 26 is coupled between PEM hydrogen pump 30 and fuel cell 20. System 10 also includes a blower 28 coupled between an outlet of HT HX 26 and PEM hydrogen pump 30, a hydrogen gas storage unit 32 coupled to PEM hydrogen pump 30, and a carbon dioxide ($CO_2$) storage unit 34 coupled to PEM hydrogen pump 30 and blower 28. Steam reformer/Sabatier reactor 24 generally includes a catalyst that can perform the functions of steam reformation and the Sabatier reactions such as Ni, Ru or Rh.

With reference to FIG. 1A, when the grid is in demand, fuel cell system 10 is in the fuel cell or forward mode such that electrical power is being produced from natural gas. To produce this electrical power, air flows fuel cell system 10 through air intake 12 and natural gas (CH$_4$), stored in a natural gas storage unit 36, water (H$_2$O), hydrogen (H$_2$), and carbon dioxide (CO$_2$) all flow into LT HX 26. The natural gas, water, hydrogen, and carbon dioxide in LT HX 26 are heated to approximately 500-700° C. and then flow into steam reformer 24, where the natural gas is reformed into hydrogen according to the endothermic or heat absorbing reactions shown in FIG. 2A. The hydrogen, carbon dioxide, and excess water from steam reformer 24 then flow into HT HX 22 and are heated to approximately 700-800° C. before flowing into fuel cell 20. Within fuel cell 20, oxygen from the air and reformed hydrogen created from the fuel or natural gas react to produce the electrical power that is then sent out to the grid. Any excess air or oxygen provided to fuel cell 20 is returned to air heat exchanger 18 and released back into the atmosphere through air exhaust 14.

In various embodiments, such as start-up and/or during periods of stable or low activity (e.g., a grid or an engine at idle), the air received through air intake 12 may need to be heated prior to being supplied to air heat exchanger 18 and fuel cell 20 such that the air may be sufficiently heated prior to flowing into fuel cell 20. To heat this air, natural gas is provided to burner 16 and burned creating heat to heat the air before it is provided to air heat exchanger 18 and further heated.

The reactions that occur to produce this electrical power result in hydrogen and carbon dioxide by-products along with water. The hydrogen, carbon dioxide, and water, or by-products, flow back to HT HX 22 and then LT HX 26. From LT HX 26, a portion of these by-products flow to blower 28 to be mixed with additional natural gas and provided back to LT HX 26 to flow back to fuel cell 20 to continue the production of electrical power. The remaining portion of these by-products flows to PEM hydrogen pump 30 where the hydrogen and carbon dioxide are separated and provided to their respective storage units 32 and 34.

Figure 2B:
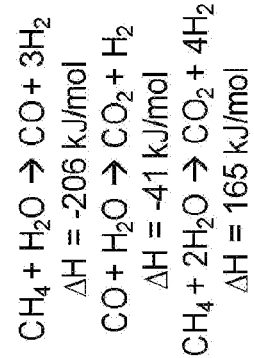
FIG. 2B shows reactions carried out in the steam reformer of the reversible fuel cell system of FIG. 1B with the steam reformer acting as a Sabatier Reactor.

With reference now to FIG. 1B, when the grid is in low demand and low-cost power is available, fuel cell system 10 operates in the electrolysis or reverse mode in which electrical power is being consumed and natural gas or methane (CH$_4$) is being formed. The reverse mode helps with the thermal management of the system 10 and keeps system 10 heated when not in use for providing electrical power. In the reverse/electrolysis mode, steam reformer 24 is operated in reverse as a Sabatier Reactor. To form the natural gas or methane (CH$_4$), air still flows into fuel cell system 10 through air intake 12. However, rather than fuel or hydrogen being provide to fuel cell 20, water from a water storage unit 40 along with hydrogen gas and carbon dioxide circulating in system 10 are provided to fuel cell 20. In addition, power is provided to fuel cell 20 such that the water and oxygen within the air can react and create hydrogen and oxygen gases since the reaction between the water and the oxygen requires energy to break the hydrogen and oxygen bonds in the water and oxygen bonds in the oxygen. Without the addition of power, the bonds between the hydrogen and oxygen in water and oxygen in the oxygen gas will not break, and water and oxygen will continue to coexist without reacting. The oxygen gas is exhausted through air exhaust 14, while the hydrogen gas, along with the unreacted carbon dioxide and any excess water, flow through HT HX 22 and provided to steam reformer 24, now acting as a Sabatier Reactor. Within steam reformer 24, the reactions shown in FIG. 2B are carried out such that natural gas or methane and water are formed from the hydrogen gas and carbon dioxide. The reactions carried out in steam reformer 24 (acting as a Sabatier Reactor) are exothermic, or release energy or heat, and therefore help balance the heat on the anode side by providing or creating heat (rather than absorbing or using heat as done in the fuel cell mode) and maintain a thermal balance of system 10.

The methane and water formed, along with any by-products such as excess hydrogen gas and/or carbon dioxide, then flow through LT heat exchanged 26. From LT HX 26, a portion of the methane, water and/or by-products flow to blower 28 to be mixed with additional water and provided back to LT HX 26 to flow back to fuel cell 20 to continue the production of natural gas, and the remaining portion of the natural gas, water and/or by-products flow to PEM hydrogen pump 30 where the hydrogen and natural gas are separated. The hydrogen is provided to hydrogen storage unit 32. In various embodiments, at least some of the formed and separated natural gas may be routed to burner 16 to provide additional heat to system 10, if needed. Any of the formed and separated natural gas not provided to burner 16 may be provided and/or sold back to a pipeline of natural gas.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A solid oxide reversible fuel cell system comprising:
a solid oxide reversible fuel cell;
an air intake for providing air to the solid oxide reversible fuel cell;
a steam reformer fluidly coupled to the solid oxide fuel cell, the steam reformer having a catalyst; and
a proton exchange member hydrogen pump configured to receive by-products from at least one of the steam reformer and the solid oxide reversible fuel cell, the proton exchange member hydrogen pump configured to form hydrogen gas from the by-products,
wherein the steam reformer is configured to produce hydrogen gas in a forward mode, the hydrogen gas provided to the solid oxide reversible fuel cell such that the solid oxide reversible fuel cell can produce electrical power; and
wherein the steam reformer is configured to produce natural gas and water from the hydrogen, and carbon dioxide that is produced in the forward mode.

2. The solid oxide reversible fuel cell system of claim 1, further comprising:
a high temperature heat exchanger coupled between the solid oxide fuel cell and the steam reformer; and
a low temperature heat exchanger coupled between the steam reformer and the proton exchange member hydrogen pump, the by-products from the at least one of the steam reformer and the solid oxide reversible fuel cell configured to flow through the low temperature heat exchanger before reaching the proton exchange member hydrogen pump.

3. The solid oxide reversible fuel cell system of claim 2, further comprising:
a blower coupled between an outlet of the low temperature heat exchanger and an inlet of the proton exchange member hydrogen pump, wherein the blower is configured to flow at least a portion of the by-products back to the low temperature heat exchanger.

4. The solid oxide reversible fuel cell system of claim 1, further comprising:
a burner coupled to the air intake; and
an air heat exchanger coupled to the burner, wherein at least one of the burner and the air heat exchanger is configured to heat the air from the air intake prior to the air being provided to the solid oxide reversible fuel cell.

5. A method of maintaining a thermal balance in a solid oxide reversible fuel cell system comprising a solid oxide reversible fuel cell, an air intake for providing air to the solid oxide reversible fuel cell, and a steam reformer fluidly coupled to the solid oxide fuel cell for providing fuel to the solid oxide reversible fuel cell, the method comprising:
operating the solid oxide reversible fuel cell system in a forward mode in which the steam reformer receives natural gas and produces hydrogen gas to be provided to the solid oxide reversible fuel cell such that the solid oxide reversible fuel cell can produce electrical power from the air and the hydrogen gas received therein; and
operating the solid oxide reversible fuel cell system in a reverse mode in which the steam reformer receives hydrogen gas and carbon dioxide from the solid oxide reversible fuel cell and produces natural gas and water.

6. The method of claim 5, further comprising:
providing a portion of the natural gas produced by the steam reformer to the air intake to provide additional heat to the solid oxide reversible fuel cell system.

7. The method of claim 5, wherein the solid oxide reversible fuel cell system further comprises:
a high temperature heat exchanger coupled between the solid oxide fuel cell and the steam reformer; and
a low temperature heat exchanger coupled between the steam reformer and the proton exchange member hydrogen pump, the by-products from the at least one of the steam reformer and the solid oxide reversible fuel cell flowing through the low temperature heat exchanger before reaching the proton exchange member hydrogen pump.

8. The method of claim 7, wherein the solid oxide reversible fuel cell system of further comprises a blower coupled between an outlet of the low temperature heat exchanger and an inlet of the proton exchange member hydrogen pump, wherein the blower flows at least a portion of the by-products back to the low temperature heat exchanger.

9. The method of claim 5, wherein the solid oxide reversible fuel cell system comprises:
a burner coupled to the air intake; and
an air heat exchanger coupled to the burner, wherein at least one of the burner and the air heat exchanger heats the air from the air intake prior to the air being provided to the solid oxide reversible fuel cell.

10. A solid oxide reversible fuel cell system comprising:
a solid oxide reversible fuel cell;
an air intake for providing air to the solid oxide reversible fuel cell;
a steam reformer fluidly coupled to the solid oxide fuel cell, the steam reformer having a catalyst;
a proton exchange member hydrogen pump configured to receive by-products from at least one of the steam reformer and the solid oxide reversible fuel cell, the proton exchange member hydrogen pump configured to form hydrogen gas from the by-products, wherein the steam reformer acts in a forward mode to produce hydrogen gas and a reverse mode to produce water and natural gas;
a low temperature heat exchanger coupled between the steam reformer and the proton exchange member hydrogen pump, the by-products form the at least one of the steam reformer and the solid oxide reversible fuel cell configured to flow through the low temperature heat exchanger before reaching the proton exchange member hydrogen pump; and
a blower coupled between an outlet of the low temperature heat exchanger and an inlet of the proton exchange member hydrogen pump, wherein the blower is configured to flow at least a portion of the by-products back to the low temperature heat exchanger.

11. The solid oxide reversible fuel cell system of claim 10, further comprising:
a high temperature heat exchanger coupled between the solid oxide fuel cell and the steam reformer.

12. The solid oxide reversible fuel cell system of claim 10, further comprising:
a burner coupled to the air intake; and an air heat exchanger coupled to the burner, wherein at least one of the burner and the air heat exchanger is configured to heat the air from the air intake prior to the air being provided to the solid oxide reversible fuel cell.

13. The solid oxide reversible fuel cell system of claim 10, wherein, in the forward mode, the air and hydrogen gas from natural gas are provided to the solid oxide reversible fuel cell, and in the reverse mode, the air and water are provided to the solid oxide reversible fuel cell.

\* \* \* \* \*